US012703810B2

(12) United States Patent
Osborne

(10) Patent No.: US 12,703,810 B2
(45) Date of Patent: Aug. 11, 2026

(54) STRONG AND STRETCHABLE SEAM TAPE

(71) Applicant: Avient Protective Materials B.V., Geleen (NL)

(72) Inventor: Eva Osborne, Echt (NL)

(73) Assignee: AVIENT PROTECTIVE MATERIALS B.V., Geleen (NL)

( * ) Notice: Subject to any disclaimer, the term of this patent is extended or adjusted under 35 U.S.C. 154(b) by 538 days.

(21) Appl. No.: 17/625,298

(22) PCT Filed: Jul. 8, 2020

(86) PCT No.: PCT/EP2020/069173
§ 371 (c)(1),
(2) Date: Jan. 6, 2022

(87) PCT Pub. No.: WO2021/005083
PCT Pub. Date: Jan. 14, 2021

(65) Prior Publication Data

US 2022/0380630 A1 Dec. 1, 2022

Related U.S. Application Data

(60) Provisional application No. 62/871,292, filed on Jul. 8, 2019.

(30) Foreign Application Priority Data

Aug. 12, 2019 (EP) .................................... 19191163

(51) Int. Cl.
*C09J 7/24* (2018.01)
*C09J 7/35* (2018.01)
*C09J 175/04* (2006.01)

(52) U.S. Cl.
CPC ................ *C09J 7/243* (2018.01); *C09J 7/35* (2018.01); *C09J 175/04* (2013.01); *C09J 2301/16* (2020.08); *C09J 2301/304* (2020.08)

(58) Field of Classification Search
CPC ... C09J 7/243; C09J 7/35; C09J 175/04; C09J 2301/16; C09J 2301/304; C09J 7/10
See application file for complete search history.

(56) References Cited

U.S. PATENT DOCUMENTS 3,219,508 A * 11/1965 Studer ................ B29C 65/5028 428/102
2008/0085388 A1* 4/2008 Tynan .................... B32B 5/024 428/354

(Continued)

FOREIGN PATENT DOCUMENTS

CH 686 673 5/1996
GB 2 042 414 9/1980

(Continued)

OTHER PUBLICATIONS 3M (TM) Technical Data Sheet Uhmw Polyethylene Tape 5421 (Year: 2016).*

(Continued)

*Primary Examiner* — Cynthia L Schaller
(74) *Attorney, Agent, or Firm* — NIXON & VANDERHYE P.C.

(57) ABSTRACT

The present invention relates to a seam tape comprising at least one layer of unidirectionally aligned fibers whereby the fibers are oriented substantially perpendicular to the length of the tape and the strength of the tape in the perpendicular direction is at least 200 N/2.54 cm [inch]. The fibers are selected from the group of UHMWPE, polyamide, polyester, glass or carbon fibers. Preferably the fibers are UHMWPE fibers. The seam tape may further comprise a hot melt adhesive. The hot melt adhesive preferably has a melting point which is at least 25° C. to 70° C. lower than the melting point of the fibers. The hot melt adhesive is chosen from the group consisting of thermoplastic polymers such as polyamides, co-polyamides, polyamino-amides, polyesters, polyacrylates, polymethacrylates, polyolefins, ethylene/vinyl acetate copolymers or mixtures thereof. The present invention further relates to the use of the seam tape in backpacks, packs, bags, medical gear, outdoor products, sail cloths, tents, tarps, shelters, clothing, ponchos, foul weather gear, mats, outerwear, jackets, sleeping bags, lift bags, parachutes, large kites, inflatable structures, beams, balloons, packraft, inflatable gear, liferaft, inflatable sculptures, (Continued)

Figure 1:
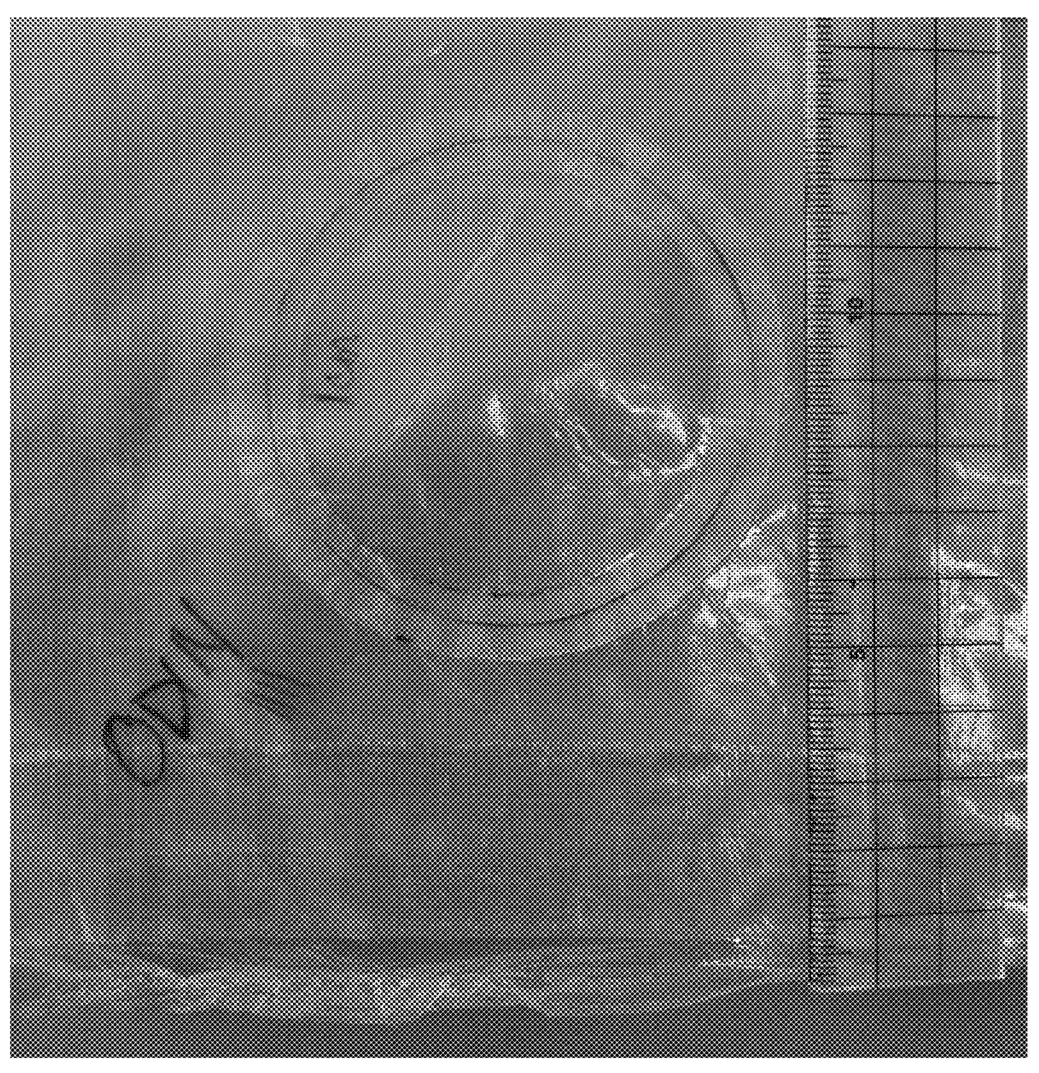

airship (HAA: High Altitude Airships), space applications, flexible circuits and footwear, inflatables, radomes, tensioned structures, or umbrellas.

14 Claims, 3 Drawing Sheets

(56) References Cited

U.S. PATENT DOCUMENTS

| | | | |
|---|---|---|---|
| 2017/0082406 A1 | 3/2017 | Marissen et al. | |
| 2017/0348947 A1* | 12/2017 | Cordova | C09J 7/243 |

FOREIGN PATENT DOCUMENTS

| | | |
|---|---|---|
| WO | 01/73173 | 10/2001 |
| WO | 2008/116702 | 10/2008 |
| WO | WO 2009/056286 A1 * | 5/2009 |

OTHER PUBLICATIONS 3M (TM) Technical Data Sheet Scotch (R) Bi-Directional Filament Tape 8959 (Year: 2003).*

International Search Report for PCT/EP2020/069173, mailed Oct. 20, 2020, 3 pages.

Written Opinion of the ISA for PCT/EP2020/069173, mailed Oct. 20, 2020, 6 pages.

* cited by examiner

STRONG AND STRETCHABLE SEAM TAPE

CROSS-REFERENCE TO RELATED APPLICATIONS

This application is the U.S. national phase of International Application No. PCT/EP2020/069173 filed Jul. 8, 2020 which designated the U.S. and claims priority to U.S. Provisional Patent Application No. 62/871,292, filed Jul. 8, 2019, and EP Patent Application No. 19191163.5 filed Aug. 12, 2019, the entire contents of each of which are hereby incorporated by reference.

FIELD

The present invention relates to a seam tape comprising fibers. The invention also relates to a process for the manufacturing of the seam tape. The invention further relates to the use of these seam tapes in different applications.

BACKGROUND AND SUMMARY

Seam tapes are known in the art. In for example CH-A-686 673 a seam tape is disclosed which is an elastic and stretchable single-sided adhesive tape which has a high tensile strength. This single-sided tape allows the sealing of joints and cracks, that may occur due to movements in the interior of house building. To solve the problem, different types of fiber reinforcement are disclosed. If a purely longitudinal tensile strength is desired, the reinforcement is in the length of the tape, if vertical tear strength is desired, a cross in-laid reinforcement is required. The occurrence of cracks due to building movement requires adhesive tapes which are stretchable to the length of the tape but less stretchable in the width of the tape. As a result, adhesive tapes having a correspondingly designed primary longitudinal reinforcement on the one hand and a transverse on the other hand best meet these requirements. It is however seen that prior art adhesive tapes as disclosed in CH-A-686 673 and used on rigid or hard surfaces detach. There is thus a need for tape that maintains connection and that is able to stretch in the longitudinal direction to provide a seam that is substantially free of creases and folds which creates the ability to seal around curves.

Seam tapes are used in all kind of applications. In practice it is often seen that problems like delamination of the tape occurs, especially in places like folds or thicker seam intersections or over a longer length. Moreover, the ability to seal around curves such that the seam is substantially free of creases and folds which is critical for applications that must maintain pressure is a problem in the field. Folds and creases will form on the inner radius of a curve and will negatively affect the seam strength and sealing performance.

It is the object of the present invention to provide a seam tape that does not show the above-mentioned disadvantages.

It is a further object to the present invention to provide a seam tape that is sufficiently strong and durable to maintain its integrity in time and which can withstand tension stretching.

Another object of the present invention is to provide a seam that is substantially free of creases and folds which creates the ability to seal around curves which is critical for applications that must maintain pressure, such as inflatables.

The object of the present invention has been achieved in that a seam tape is provided comprising at least one layer of unidirectionally aligned fibers whereby the fibers are oriented substantially perpendicular to the length of the tape and the strength of the tape in the perpendicular direction is at least 200 N/2.54 cm [inch].

DETAILED DESCRIPTION OF EMBODIMENTS

Surprisingly it has been found that when a seam tape comprising at least one layer of unidirectionally aligned fibers which are oriented substantially perpendicular to the tape direction, much smaller radius curves can be sealed without folds or creases. This results in the ability to withstand higher pressures which is important for some applications such as for inflatable structures.

Substantially perpendicular in the present invention means that the fiber orientation is such that fibers are orientated between +30/−30 degrees from the perpendicular direction, more preferred +20/−20 degrees from the perpendicular direction, most preferred +10/−10 degrees from the perpendicular direction.

The strength of the tape in the perpendicular direction (the direction of the fiber reinforcement), is at least 200 N/2.54 cm [inch], preferable at least 1000 N/2.54 cm [inch], more preferably at least 2200 N/2.54 cm [inch].

The seam tape according to the present invention comprises at least one layer of unidirectionally aligned fibers selected from the group of synthetic or natural fibers or a combination thereof. Examples of synthetic fibers are polyethylene, polyamide such as aramid (known under the commercial names Kevlar, Nomex, Technora, Twaron), liquid crystal polymer (Vectran), high tenacity polypropylene, polyimide, polyester, glass or carbon fibers. Examples of natural fibers are cotton, hemp, wool, silk, jute or linen fibers. Preferably the seam tape comprises at least one layer of unidirectionally aligned high tenacity fibers selected from the group of UHMWPE or polyamide such as aramid. More preferably the layer comprises ultra-high molecular weight polyethylene (UHMWPE) fibers.

Fibers with a high strength/weight ratio are preferred as they allow to provide a seam tape with high strength at minimal tape thickness. Limiting the tape thickness is of importance as it can minimize bending deflection under loading and such high strength. Low thickness tapes are best suited for seaming of high strength, low thickness fabrics. The thickness of the tape is preferably between 125-500 μm, preferably between 150-350 μm, even more preferably between 50-200 μm.

The overall stiffness of the tape is less than 10,000 N/m, more preferably less than 5,000 N/m, and even more preferably less than 3,000 N/m. The stiffness of the seam tape is important to provide a seam that is substantially free of creases and folds which creates the ability to seal around curves. If the seam tape is too stiff the tape will detach.

The seam tape may comprise more than one layer, in which each layer may comprise the same or different unidirectionally aligned fibers. Preferably the seam tape comprises two layers of unidirectionally aligned UHMWPE fibers. Either in case of one or more layers of unidirectionally aligned fibers, the layers comprise fibers that are oriented substantially perpendicular to the length of the tape.

UHMWPE may be linear or branched, although preferably linear polyethylene is used. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR. The linear polyethylene may further contain up to 5 mol % of one or more other alkenes that are copolymerisable therewith, such as propene, butene, pentene, 4-methylpentene, octene. Preferably, the linear polyethylene is of high molar mass with an intrinsic viscosity (IV, as determined on solutions in decalin at 135° C.) of at least 4 dl/g; more preferably of at least 8 dl/g, most preferably of at least 10 dl/g. Such polyethylene is referred to as ultra high molecular weight polyethylene known under the commercial name Spectra or Dyneema.

UHMWPE fibres consist of polyethylene filaments that have been prepared by a gel spinning process, such as described, for example, in GB 2042414 A or WO 01/73173 A1. A gel spinning process essentially consists of preparing a solution of a linear polyethylene with a high intrinsic viscosity, spinning the solution into filaments at a temperature above the dissolving temperature, cooling down the filaments to below the gelling temperature, such that gelling occurs, and stretching the filaments before, during and/or after the removal of the solvent.

The seam tape of the present invention preferably contains UHMWPE fibers that comprise polyethylene filaments, also referred to as high tenacity polyethylene filaments. By filaments is herein understood an elongate body, the length dimension of which is much greater that the transverse dimensions of width and thickness. Accordingly, the term filament includes ribbons, strip, band, and the like having regular or irregular cross-sections. The filaments may have continuous lengths, known in the art as continuous filaments, or discontinuous lengths, called in the context of the present application short fibers. Short fibers can be obtained by cutting or stretch-breaking filaments.

The seam tape of the present invention further comprises a hot melt adhesive layer. Hot-melt adhesives are thermoplastic bonding materials applied as melts that achieve a solid state and resultant strength on cooling. These thermoplastic 100% solid materials melt in the temperature range from 65° C. to 180° C. Theoretically, any thermoplastic can be a hot-melt adhesive, but the most preferred materials are usually solid up to 79.4° C. or higher, then melt sharply to give a low-viscosity fluid that is easily applied.

Examples of hot melt adhesives are thermoplastic polymers such as polyamides, co-polyamides, polyaminoamides, polyesters, polyacrylates, poly-urethanes, polymethacrylates, polyolefins, ethylene/vinyl acetate copolymers or mixtures hereof. The hot melt adhesive should have a melting point no more than 50° C. higher than the melting point of the fibers, preferably below the melting point of the fibers, and more preferably at least 25° C. to 70° C. lower than the melting point of the fibers.

The thickness of the hot melt adhesive layer may vary from 10 μm and 1 mm. Preferably the thickness varies from 25 μm to 500 μm, more preferably the thickness varies from 50 μm to 200 μm.

The seam tape of the present invention optionally comprises a barrier film. A barrier film is selected for applications where the long-term durability of the seam can be improved by providing an additional material to shield the fiber and hot melt layers from environmental effects. The barrier film can provide additional benefits such as but not limited to increased abrasion resistance, better UV stability, reduced blocking, fungus resistance and reduced permeability for water. Preferably the barrier film is elastic and comprises an elastic modulus below 1 GPa. More preferred the barrier film comprises an elastic modulus below <500 MPa, even more preferred below 250 MPa, and most preferred below 100 MPa. The elastic modulus is preferably higher than 1 MPa, more preferred higher than 5 MPa, even more preferred higher than 10 MPa, and most preferred higher than 20 MPa.

The barrier film must be able to deform in order not to hamper the ability to form crease free curved seams and preferably has an elongation at break of at least 50%, more preferably at least 100% and most preferably at least 200%. Often thermoplastic polyurethane films are used as the barrier film.

The thickness of the barrier layer may vary from 500 nm and 1 mm. Preferably the thickness varies from 1 μm to 500 μm. More preferably the thickness varies from 25 μm to 400 μm, more preferably the thickness varies from 50 μm to 200 μm.

Examples of barrier films are thermoplastic polyolefins and thermoplastic elastomers based on urethanes, amides, or esters. Examples of suitable barrier films are aromatic or aliphatic thermoplastic polyurethane films such as Covestro's Duraflex® or Dingzing's Provecta™ films. Preferably the barrier film is a thermoplastic polyurethane.

The seam tape according to the present invention comprises unidirectionally aligned fibers which are preferably embedded in a flexible polymeric matrix material. The matrix material can be an elastomeric thermoset material, a thermoplastic polymer, or a hot melt adhesive. Examples of elastomeric thermosets are urethanes such as Hysol US0028, polyesters such as Thiokol Adcote 122 or silicones such as DOW-96-083, -X3-6930, -6858 (UV curable). Examples of thermoplastics are nylon, low density polyethylene, polypropylene or engineering thermoplastics (such as Peek, PPS, Radel, Ryton). Examples of hot melt adhesives are polyolefins, polyamides or polyurethanes. The matrix material can be identical to the hot melt adhesive.

The seam tape of the present invention preferably comprises the following properties; in the longitudinal direction it preferably has a modulus <1 GPa, more preferably <500 MPa, even more preferability <250 MPa, and most preferred <100 MPa. The modulus is preferably above 1 MPa, more preferred above 5 MPa, even more preferred above 10 MPa, and most preferred above 20 MPa.

The seam tape of the present invention preferably comprises a strain at break of at least 50%, more preferred at least 100%, and most preferred at least 200%.

The invention further relates to the process for the manufacturing of a seam tape according to the present invention. The process may comprise the following ways to manufacture the seam tape:

a) Aligned fibers are spread and pressed into a film of hot melt adhesive using a calender roll or similar process
b) A unidirectional (UD) layer of spread fibers in a flexible polymer matrix is provided which is adhered to a film of hot melt adhesive. This can be accomplished in two steps such that the UD composite and the hot melt film are formed separately and then brought together and adhered in a calendering, pressing, or autoclaving step.
c) Alternatively the hot melt film can be formed directly on the UD layer via for example an extrusion process.
d) Additional layers such as the barrier film or multiple UD fiber layers can added and adhered in a calendering, pressing, or autoclaving step
e) After forming the laminate structure can be split to the desired width to form a seam tape.

It is an object of the present invention to provide a seaming process that is as simple and as economical as possible. The seaming process should soften the adhesive in the tape and bring it into contact with the surface to be bonded under sufficient pressure to provide fusion. Numerous welding techniques can be used including lamination, hot gas or hot air welding, hot wedge welding, hot plate welding, infrared welding, laser welding, vibration welding, ultrasonic welding, and RF welding.

A layer of unidirectionally aligned fibers can be layered in specific orientations, preferably the layers comprise fibers that are oriented in the same perpendicular direction whereafter the layer(s) are laminated to a fabric product. After lamination the UD tape is cured in or out of an autoclave. A preferred unidirectional (UD) tape is preferably manufactured by spreading fibers and coating them with an adhesive onto a release paper to form a continuous sheet. This preferred unidirectional tape is nonwoven. Preferably, these unitape sheets are cut to size.

The present invention further relates to the use of the seam tape according to the present invention in backpacks, packs, bags, medical gear, outdoor products, sail cloths, tents, tarps, shelters, clothing, ponchos, foul weather gear, mats, outerwear, jackets, sleeping bags, lift bags, parachutes, large kites, inflatable structures, beams, balloons, packraft, inflatable gear, liferaft, inflatable sculptures, airship (HAA: High Altitude Airships), space applications, flexible circuits and footwear, inflatables, radomes, tensioned structures, or umbrellas.

FIGURES

Figure 2:
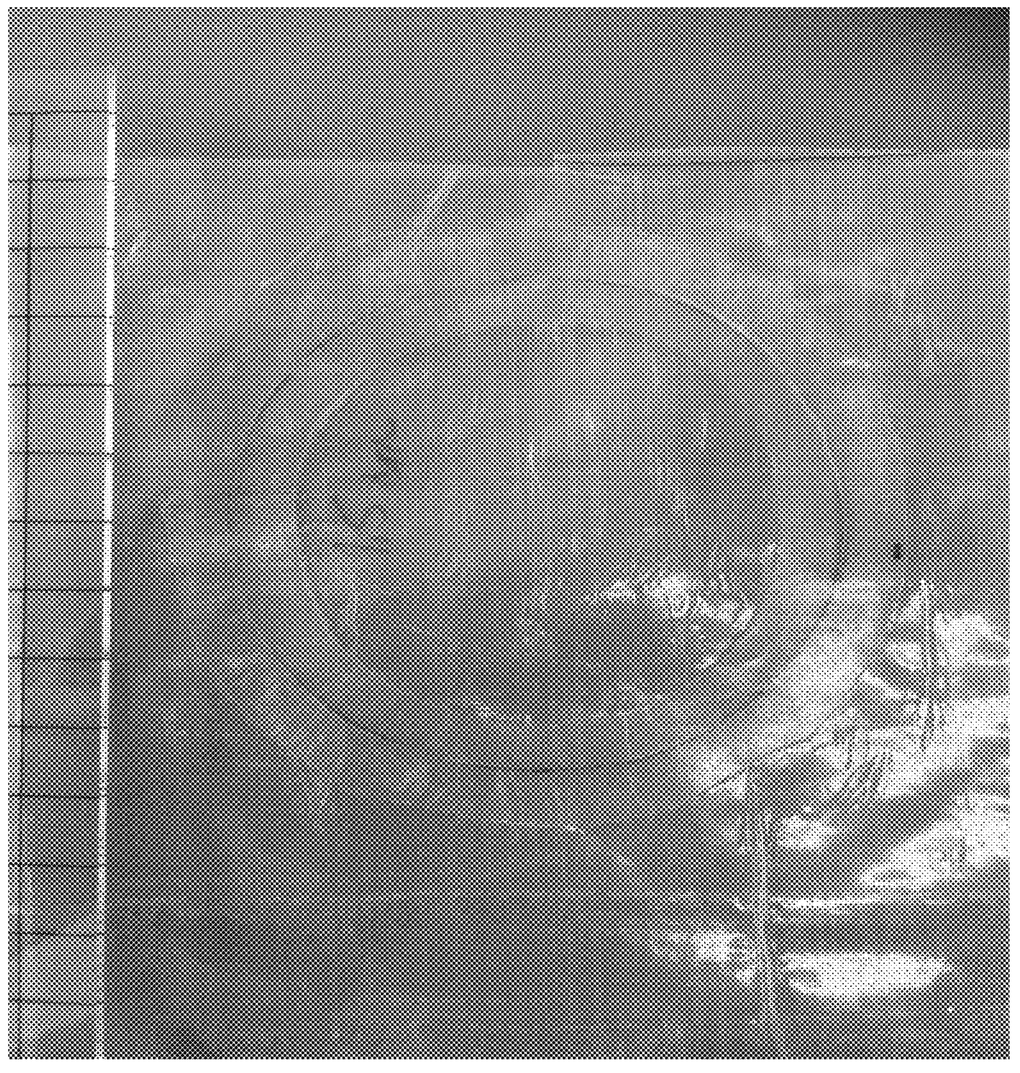

FIG. 1: a 1 cm wide seam tape with reinforcement perpendicular to tape length able to form seal over a circle with inner diameter 6.5 cm, outer diameter 8.5 cm without the formation of creases or folds in the tape FIG. 2: a 1.5 cm wide seam tape with reinforcement perpendicular to tape length able to form seal over a circle with inner diameter of 6 cm, outer diameter 9 cm without the formation of creases or folds in the tape.

Figure 3:
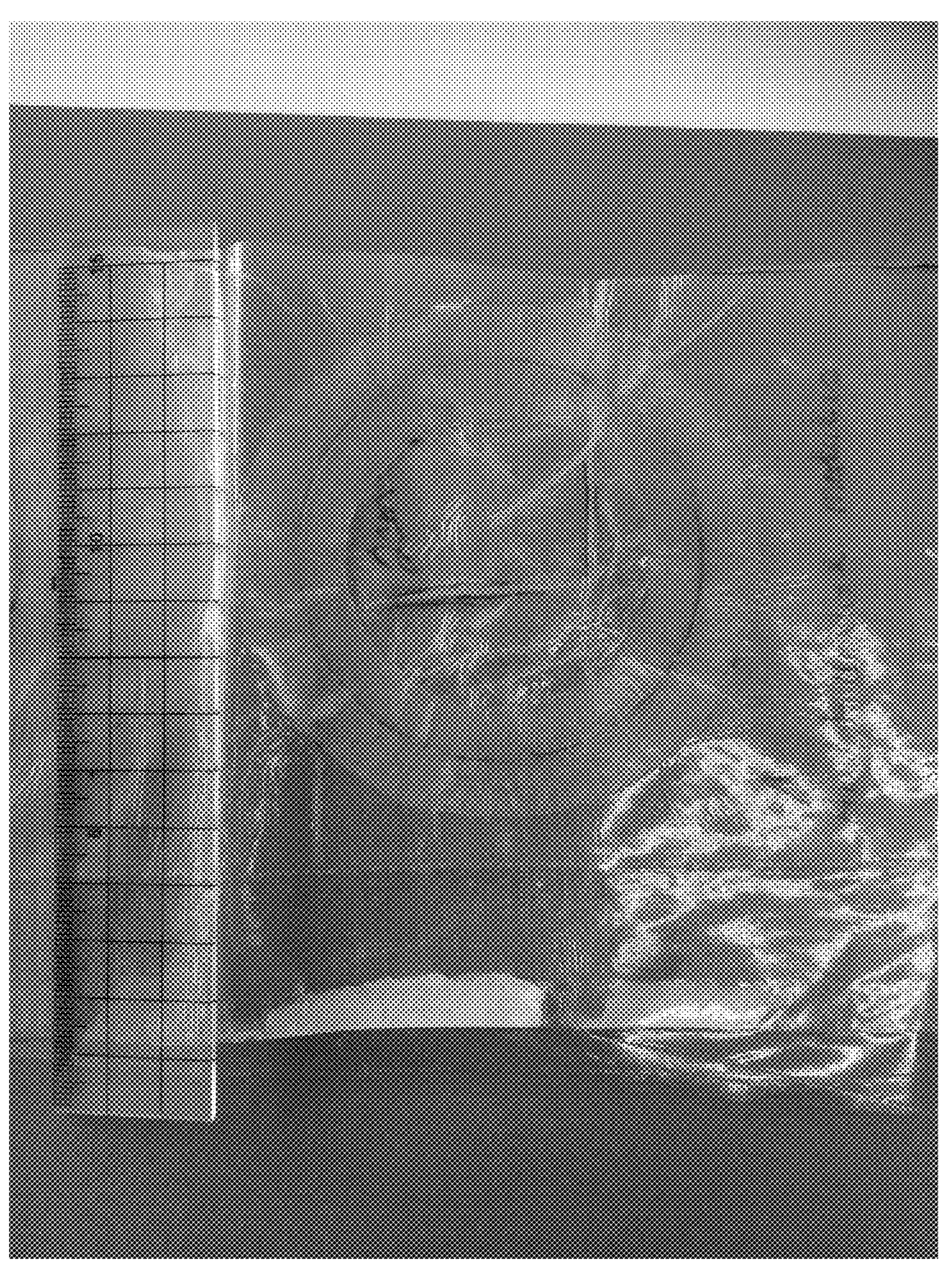

FIG. 3: a 2 cm wide seam tape with reinforcement perpendicular to tape length able to form seal over a circle with inner diameter of 5.5 cm, outer diameter 9.5 cm without the formation of creases or folds in the tape

METHODS OF MEASURING

1. Side chains in a polyethylene or UHMWPE sample is determined by FTIR on a 2 mm thick compression molded film by quantifying the absorption at 1375 $cm^{-1}$ using a calibration curve based on NMR measurements (as disclosed in e.g. EP 0 269 151)

2. Tensile properties, i.e. strength and modulus, of fibers were determined on multifilaments as specified in ASTM D885M, using a nominal gauge length of the fibre of 500 mm, a crosshead speed of 50%/min and Instron 2714 clamps, of type Fibre Grip D5618C. For calculation of the strength, the tensile forces measured are divided by the titre, as determined by weighing 10 meter of fibre; values in GPa for are calculated assuming the natural density of the polymer, e.g. for UHMWPE is 0.97 $g/cm^3$.

3. The tensile properties of tapes: tensile strength, tensile modulus, and elongation at break are defined and determined at 20° C. on tapes (if applicable obtained by slitting) of a width of 2 mm as specified in ASTM D882, using a nominal gauge length of the tape of 131 mm, a crosshead speed of 50 mm/min.

EXAMPLES

Example 1

Seam tapes were constructed with UHMWPE fibers that were oriented perpendicular to the tape length.

The seam tape comprises an outer barrier layer which is an elastomeric thermoplastic polyurethane, an adhesive layer which is a hot melt thermoplastic polyurethane, a fiber layer that consists of UHMWPE fibers embedded in a polymer matrix and a final adhesive layer which is a hot melt thermoplastic polyurethane. The seam tape was slit to different widths and the smallest radius of curvature circle it was able to seal without the formation of creases or folds. Samples were adhered using a hot press at temperatures below 140° C. to a composite fabric with a thermoplastic polyurethane face film. Results are given in Table 1

Comparative Experiment A

Seam tapes were constructed as in example 1 except that the UHMWPE fibers were either orientated parallel and perpendicular to the tape length. Results are given in Table 1.

Results

TABLE 1

| Example | Tape | Tape Width [cm] | Inner diameter [cm] | Folds or Creases observed? | Water column height when leakage is observed |
|---|---|---|---|---|---|
| 1.1 | Example 1 | 1 | 6.5 | No | >500 cm H20 |
| A.1 | Comparative Ex A | 1 | 6.5 | YES | 40 cm H20 |
| A.2 | Comparative Ex A | 1 | 16 | Yes | Not measured |
| 1.2 | Example 1 | 2.5 | 9 | No | Not measured |
| A.3 | Comparative Ex A | 2.5 | 9 | YES | Not measured |
| 1.3 | Example 1 | 1.5 | 6 | No | Not measured |
| 1.4 | Example 1 | 2 | 5.5 | No | Not measured |

From the results in Table 1 it is clear that Example 1, with fibers are oriented perpendicular to the tape length can form a crease free seal at much smaller radius of curvature than the tape of comparative experiment A with the same total amount of fiber reinforcement but with fibers orientated both parallel and perpendicular to the tape length.

The invention claimed is:

1. A seam tape having length and width dimensions, the seam tape comprising:
at least one fiber layer, and
a hot melt adhesive film layer, wherein
the at least one fiber layer comprises:
(i) a flexible polymeric matrix material, and
(ii) ultrahigh molecular weight polyethylene (UHMWPE) fibers which are unidirectionally aligned and oriented in a substantially perpendicular direction to the length dimension of the tape and embedded in the flexible polymeric matrix material, and wherein
the seam tape has a thickness of 50-200 μm and a strength in the perpendicular direction which is at least 200 N/2.54 cm.

2. The seam tape according to claim 1, wherein the flexible polymeric material is a hot melt adhesive that may be the same or different than the hot melt adhesive layer and has a melting point which is no more than 50° C. higher than the melting point of the fibers.

3. The seam tape according to claim 1, wherein the flexible polymeric matrix material is a thermoplastic polymer selected from the group consisting of polyamides, copolyamides, polyaminoamides, polyurethanes, polyesters, polyacrylates, polymethacrylates, polyolefins, ethylene/vinyl acetate copolymers and mixtures thereof.

4. The seam tape according to claim 1, further comprising a barrier film layer comprising a barrier film with an elastic modulus below 1 GPa.

5. The seam tape according to claim 4, wherein the barrier film has a higher melting temperature than the melting temperature of the fibers.

6. The seam tape according to claim 4, wherein the barrier film is a thermoplastic polyurethane barrier film.

7. The seam tape according to claim 1, wherein the flexible polymeric matrix material is a hot melt adhesive that is the same as the hot melt adhesive layer.

8. The seam tape according to claim 1, wherein the tape has an overall stiffness of less than 10,000 N/m.

9. A product which comprises the seam tape according to claim 1, wherein the product is selected from the group consisting of backpacks, packs, bags, medical gear, outdoor products, sail cloths, tents, tarps, shelters, clothing, ponchos, foul weather gear, mats, outerwear, jackets, sleeping bags, lift bags, parachutes, large kites, inflatable structures, beams, balloons, packraft, inflatable gear, liferaft, inflatable sculptures, airships, products for space applications, flexible circuits, footwear, inflatables, radomes, tensioned structures and umbrellas.

10. The seam tape according to claim 1, wherein the seam tape is adapted to being applied to a curved seam of a product to seal the curved seam, wherein the seam tape exhibits no folds or ceases on an inner radius of the curved seam when sealed.

11. A product which comprises a curved seam and the seam tape according to claim 1 applied to the curved seam to thereby seal the curved seam, wherein the seam tape exhibits no folds or ceases on an inner radius of the curved seam.

12. A seam tape having length and width dimensions, the seam tape comprising:

an outer barrier film layer, at least one fiber layer having outer and inner surfaces, and, first and second adhesive film layers, the first adhesive film layer being positioned between and in contact with the outer surface of the at least one fiber layer and the outer barrier film layer, and the second adhesive film layer being in contact with the inner surface of the at least one fiber layer, wherein the at least one fiber layer comprises:

(i) a flexible polymeric matrix material, and (ii) ultrahigh molecular weight polyethylene (UHMWPE) fibers which are unidirectionally aligned and oriented in a direction substantially perpendicular to the length dimension of the tape and embedded in the flexible polymeric matrix material, and wherein the seam tape has a thickness of 50-200 μm and a strength in the perpendicular direction which is at least 200 N/2.54 cm.

13. The seam tape according to claim 12, wherein each of the first and second adhesive layers comprises a hot melt adhesive.

14. The seam tape according to claim 13, wherein the flexible polymeric material is a hot melt adhesive that may be the same or different than the hot melt adhesive of the first and second adhesive layers and has a melting point which is no more than 50° C. higher than the melting point of the fibers.

* * * * *